United States Patent
Shekhar et al.

(10) Patent No.: US 11,847,474 B2
(45) Date of Patent: Dec. 19, 2023

(54) SIMULTANEOUSLY SHARING MULTIPLE WINDOWS VIA A COLLABORATION APPLICATION

(71) Applicant: Dell Products L.P., Round Rock, TX (US)

(72) Inventors: Shashank Shekhar, Mumbai (IN); Kanika Bhatia, Delhi (IN)

(73) Assignee: Dell Products L.P., Round Rock, TX (US)

( * ) Notice: Subject to any disclaimer, the term of this patent is extended or adjusted under 35 U.S.C. 154(b) by 192 days.

(21) Appl. No.: 17/391,478

(22) Filed: Aug. 2, 2021

(65) Prior Publication Data
US 2023/0033755 A1    Feb. 2, 2023

(51) Int. Cl.
G06F 9/44 (2018.01)
G06F 9/451 (2018.01)
G06F 9/48 (2006.01)
G06F 9/445 (2018.01)

(52) U.S. Cl.
CPC .......... *G06F 9/452* (2018.02); *G06F 9/44505* (2013.01); *G06F 9/4881* (2013.01)

(58) Field of Classification Search
CPC ...................................... G06F 1/32; G06F 9/44
See application file for complete search history.

(56) References Cited

U.S. PATENT DOCUMENTS

| | | | | |
|---|---|---|---|---|
| 10,180,862 B1* | 1/2019 | Schleifer | ................ | G06F 9/542 |
| 11,150,861 B1* | 10/2021 | Thomas | ................ | H04N 7/152 |
| 2004/0268270 A1* | 12/2004 | Hill | .......................... | G09G 5/14 |
| | | | | 715/744 |
| 2007/0282793 A1* | 12/2007 | Majors | ..................... | G06F 16/95 |
| 2014/0012871 A1* | 1/2014 | Jeon | ................. | G06F 16/24556 |
| | | | | 707/769 |
| 2014/0283142 A1* | 9/2014 | Shepherd | .............. | G06F 3/0488 |
| | | | | 726/30 |
| 2014/0325431 A1* | 10/2014 | Vranjes | ................. | G06F 3/0481 |
| | | | | 715/788 |

* cited by examiner

*Primary Examiner* — Keshab R Pandey
(74) *Attorney, Agent, or Firm* — KIRTON MCCONKIE; Brian Tucker

(57) ABSTRACT

Multiple windows can be simultaneously shared via a collaboration application. A multiple window sharing controller can be employed on an end user device to enable the user to create an aggregated window that includes windows of multiple applications running on the end user device. The multiple window sharing controller can cause this aggregated window to appear as an active window on the end user device. Therefore, when a collaboration application presents windows that the user can select to be shared during a meeting, the aggregated window will be included.

20 Claims, 9 Drawing Sheets

SIMULTANEOUSLY SHARING MULTIPLE WINDOWS VIA A COLLABORATION APPLICATION

CROSS-REFERENCE TO RELATED APPLICATIONS

N/A

BACKGROUND

Collaboration applications such as Zoom and Microsoft Teams allow a presenter to share his or her screen with other participants. For example, the presenter may choose to share the window of a particular application or the entire desktop.

When a presenter shares the entire desktop, he or she runs the risk that participants will see information that is confidential or personal or that otherwise should not be shared during the meeting. For example, if the presenter desires to share a single email in Outlook, the participants may be able to see all emails currently listed in Outlook's window when Outlook is brought into the foreground. To avoid such issues, the presenter may choose a single window to share. However, sharing a single window can be a tedious task particularly when the presenter desires to switch between multiple windows. For example, if the presenter is currently sharing a presentation via PowerPoint's window and desires to share a spreadsheet via Excel's Window, the presenter will need to interact with the collaboration application's interface to stop sharing PowerPoint's window and further interact with the collaborations application's interface to select Excel's window and then start sharing it.

Additionally, while a presenter is sharing a single window, if he or she positions another window overtop the shared window, the content shared with the participants may include a gray or black box where the windows are overlapped. Similarly, it can be difficult for the presenter to manage the shared window while simultaneously interacting with another window such as to take notes during the presentation.

BRIEF SUMMARY

The present invention extends to methods, systems, and computer program products for simultaneously sharing multiple windows via a collaboration application. A multiple window sharing controller can be employed on an end user device to enable the user to create an aggregated window that includes windows of multiple applications running on the end user device. The multiple window sharing controller can cause this aggregated window to appear as an active window on the end user device. Therefore, when a collaboration application presents windows that the user can select to be shared during a meeting, the aggregated window will be included.

In some embodiments, the present invention can be implemented as a method for simultaneously sharing multiple windows via a collaboration application. A window aggregator interface can be displayed to a user of an end user device. The window aggregator interface can include representations of multiple windows that are displayed on the end user device. User input that selects representations of two or more of the multiple windows can be received. An aggregated window that includes content of the two or more windows can be created. The aggregated window can be made visible to a collaboration application to thereby cause the collaboration application to be make the aggregated window available for sharing.

In some embodiments, the present invention may be implemented as computer storage media storing computer executable instructions which when executed on an end user device implement a method for simultaneously sharing windows of multiple applications via a collaboration application. Frames of multiple windows that are displayed on an end user device can be captured. A window aggregator interface can be presented to a user of the end user device. The window aggregator interface can identify the multiple windows. User input can be received at the window aggregator interface and can select two or more of the multiple windows. An aggregated window that includes the captured frames of the two or more windows can be displayed to thereby cause a collaboration application running on the end user device to make the aggregated window available to be shared.

In some embodiments, the present invention may be implemented as an end user device that includes one or more processors and computer storage media storing a multiple window sharing controller. The multiple window sharing controller can capture frames of multiple windows that are displayed on an end user device. The multiple window sharing controller can present a window aggregator interface to a user where the window aggregator interface identifies the multiple windows. The multiple window sharing controller can receive, via the window aggregator interface, user input that selects two or more of the multiple windows. The multiple window sharing controller can display an aggregated window that includes the captured frames of the two or more windows to thereby cause a collaboration application running on the end user device to make the aggregated window available to be shared.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
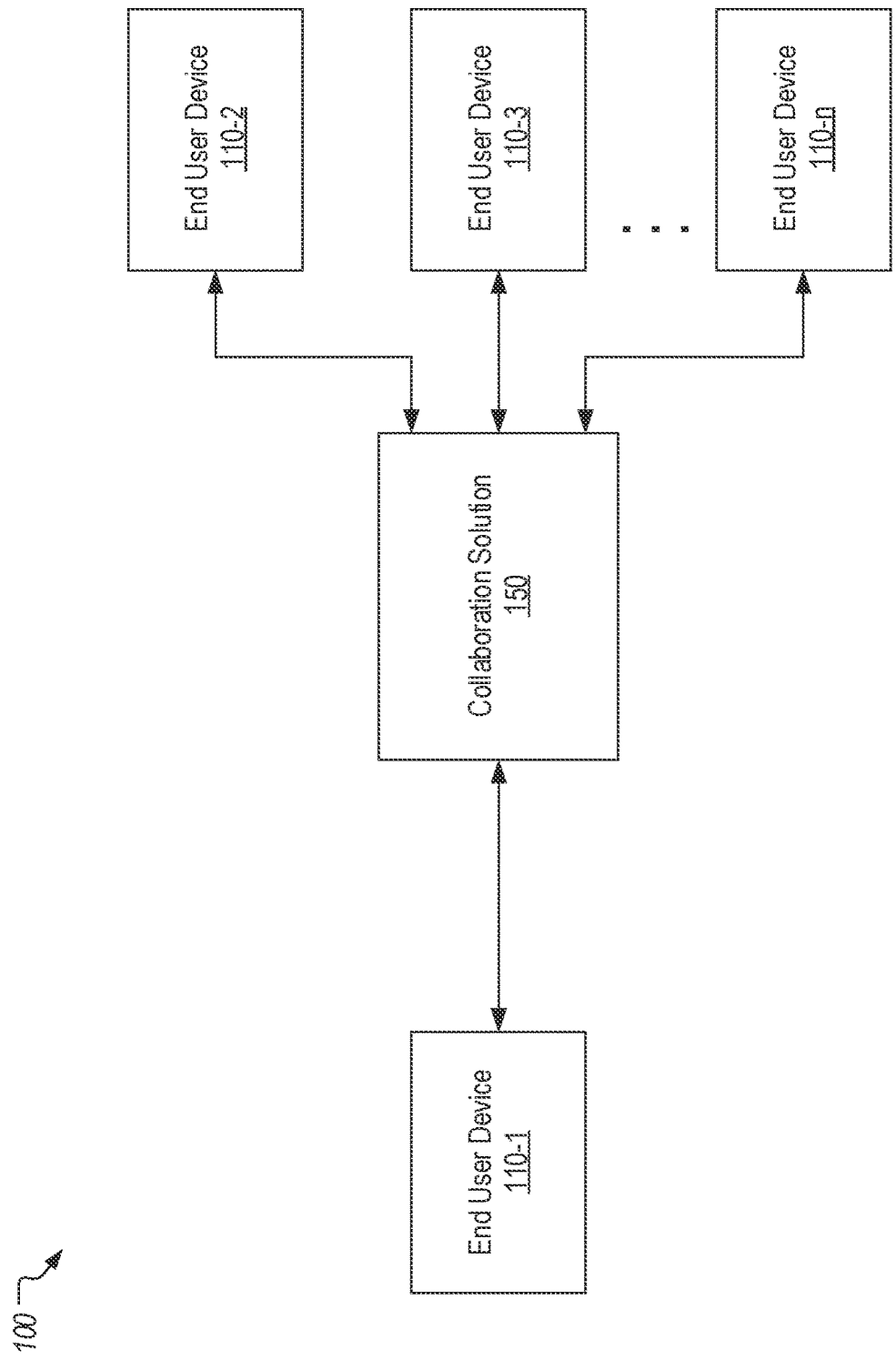
FIG. 1 illustrates an example computing environment in which the present invention can be implemented.

FIG. 1 provides an example of a collaborative computing environment 100 in which embodiments of the present invention may be implemented. Computing environment 100 includes a plurality of end user devices 110-1 through 110-n (collectively "end user devices 110") and a collaboration solution 150. In this example, collaboration solution 150 may represent Zoom, Skype, Microsoft Teams or another videoconferencing solution that may allow a user of end user device 110-1 to share his or her screen with users of end user devices 110-2 through 110-n. For example, a collaboration application installed on end user device 110-1 could capture the desktop or the window of a particular application and share it with end user devices 110-2 through 110-n.

Figure 2:
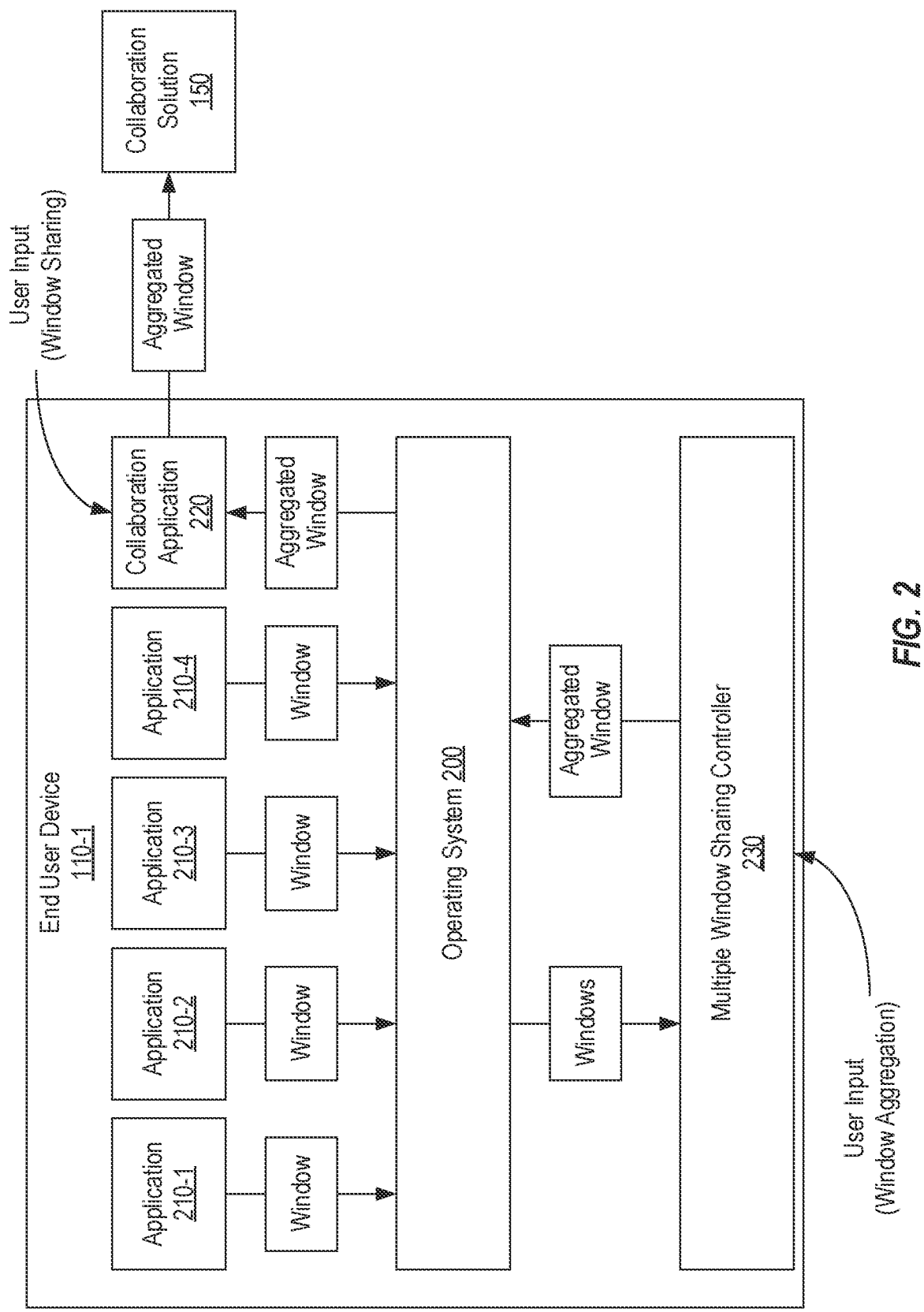
FIG. 2 illustrates an example configuration of an end user device by which embodiments of the present invention may be implemented.

FIG. 2 provides an example of various components that may be included on end user device 110-1 when end user device 110-1 is configured to implement one or more embodiments of the present invention. As shown, end user device 110-1 may include an operating system 200 (or other component(s)) that manages the creation and display of windows on end user device 110-1. For example, applications 210-1 through 210-4 (or any other number of applications) may interface with operating system 200 to generate their windows for display on end user device 110-1.

End user device 110-1 may also include a collaboration application 220 (e.g., Zoom, Skype or Microsoft Teams). Although not shown, collaboration application 220 may also interface with operating system 200 to display its window on end user device 110-1. Collaboration application 220 may be configured to interface with operating system 200 to capture and share the entire desktop or any one of the active windows on end user device 110-1 (e.g., any one of the windows of applications 210-1 through 210-4).

In accordance with embodiments of the present invention, end user device 110-1 may further include multiple window sharing controller 230 (or controller 230). Controller 230 can interface with operating system 200 to capture the windows of applications 210-1 through 210-4 for purposes of enabling the user to create an aggregated window which includes more than one of the windows. Controller 230 can interface with operating system 200 to cause this aggregated window to appear as an active window to collaboration application 220. Accordingly, collaboration application 220 will enable the user to select the aggregated window for sharing with the users of end user devices 110-2 through 110-n via collaboration solution 150.

Figure 3A:
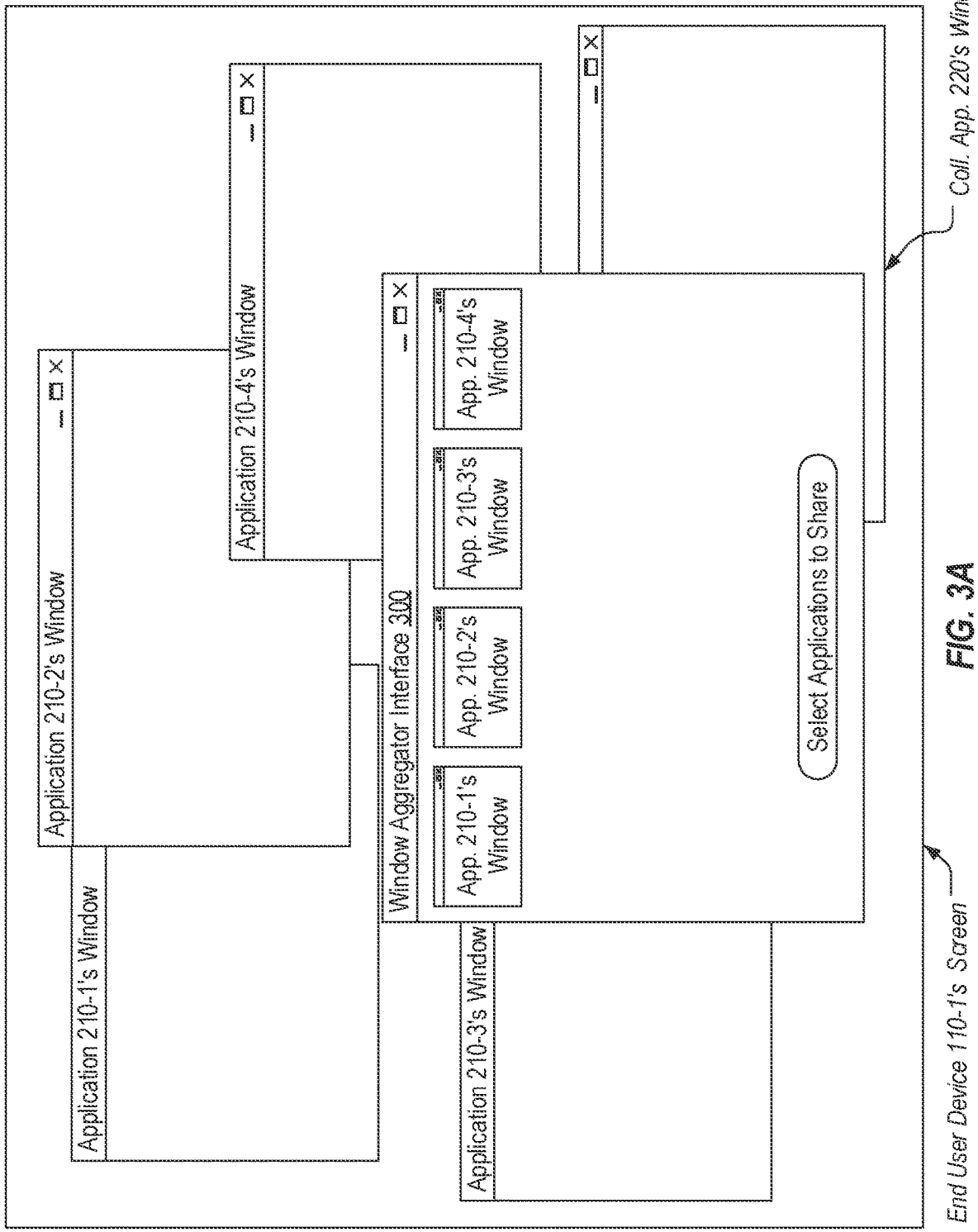
FIGS. 3A and 3B provide an example of how a multiple window sharing controller can enable a user to create an aggregated window to be shared via a collaboration application.
Figure 3B:
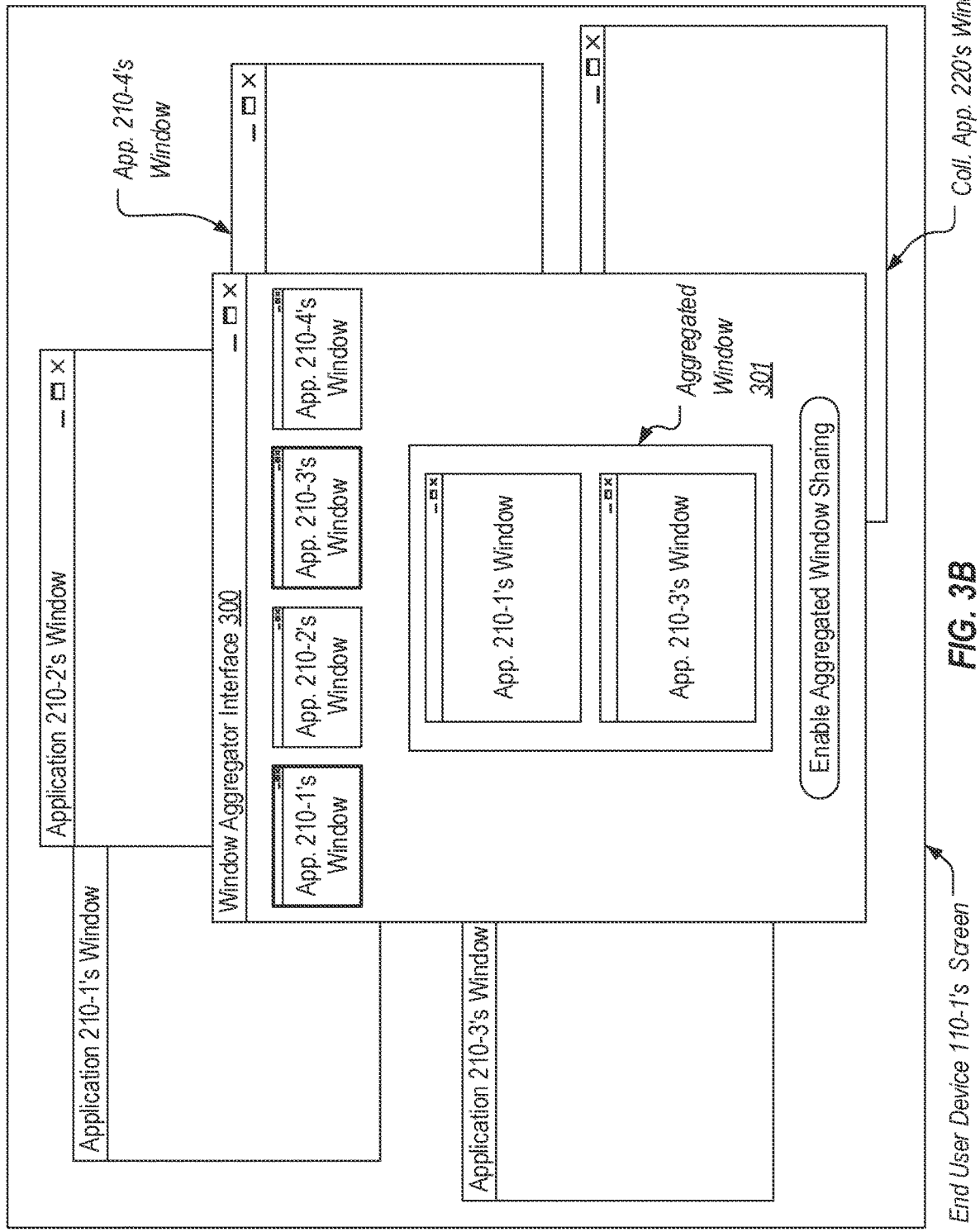

FIGS. 3A and 3B provide an example of how controller 230 may enable a user to create an aggregated window. In these figures, it is assumed that the user is running applications 210-1 through 210-n and collaboration application 220. Accordingly, there are active windows for each of application 210-1 through 210-4 and collaboration application 220.

FIGS. 3A and 3B also include a window aggregator interface 300 that controller 230 can present to the user to allow the user to select which of the active windows (e.g., which of the windows of applications 210-1 through 210-4) should be used to create an aggregated window 301. For example, in some embodiments, controller 230 can be configured to detect when collaboration application 220 is running, or when collaboration application 220 is attempting to share the user's screen, and can present window aggregator interface 300.

Window aggregator interface 300 can include a representation of each active window on end user device 110-1 but may exclude a representation of collaboration application 220's window. Window aggregator interface 300 may allow the user to select any of these representations, including selecting multiple representations or all of the representations, for purposes of specifying which applications' windows should be combined in aggregated window 301.

FIG. 3B represents an example where the user is assumed to have selected application 210-1's and application 210-3's windows. In response, controller 230 has created aggregated window 301 which includes application 210-1's and application 210-3's windows in a vertical arrangement. In addition to allowing the user to select which windows are included in aggregated window 301, window aggregator interface 300 can be configured to enable the user to configure aggregated window 301 by adjusting its size and shape, by adjusting the size and position of any window included in aggregated window 301, etc. As examples only, the user could reposition application 210-1's and application 210-3's windows within aggregated window 301 so that they are in a horizontal arrangement and/or could make one application 210-1's and application 210-3's windows larger than the other.

Once the user has selected which windows are to be included in aggregated window 301 and, in the depicted example, has selected the "Enable Aggregated Window Sharing" button, controller 230 can cause aggregated window 301 to appear as an active window on end user device 110-1. In other words, from the perspective of collaboration application 220, aggregated window 301 will appear as an active window like the windows of applications 210-1 through 210-4. Accordingly, collaboration application 220 will allow the user to select aggregated window 301 for sharing in the same manner as the user could select any of the windows of applications 210-1 through 210-4. In this way, embodiments of the present invention enable the user to share aggregated window 301 with any combination of the active windows without requiring any modification to collaboration application 220 or its screen sharing functionality.

FIGS. 4A-4E provide an example of how controller 230 can implement functionality for enabling the user to create aggregate window 301 and share it via collaboration application 220. In this example, it is again assumed that applications 210-1 through 210-4, collaboration application 220 and controller 230 are running on end user device 110-1. It is also assumed that the user is using collaboration application 220 to participate in a meeting.

Controller 230 can be configured in any suitable way to determine when to present window aggregator interface 300. For example, controller 230 could be configured to detect when collaboration application 220 is launched and closed and could present window aggregator interface 300 whenever collaboration application 220 is running. As another example, controller 230 could be configured to detect when collaboration application 220 initiates screen sharing functionality and could present window aggregator interface 300 in response. As a further example, controller 230 could allow the user to manually launch window aggregator interface 300.

Figure 4A:
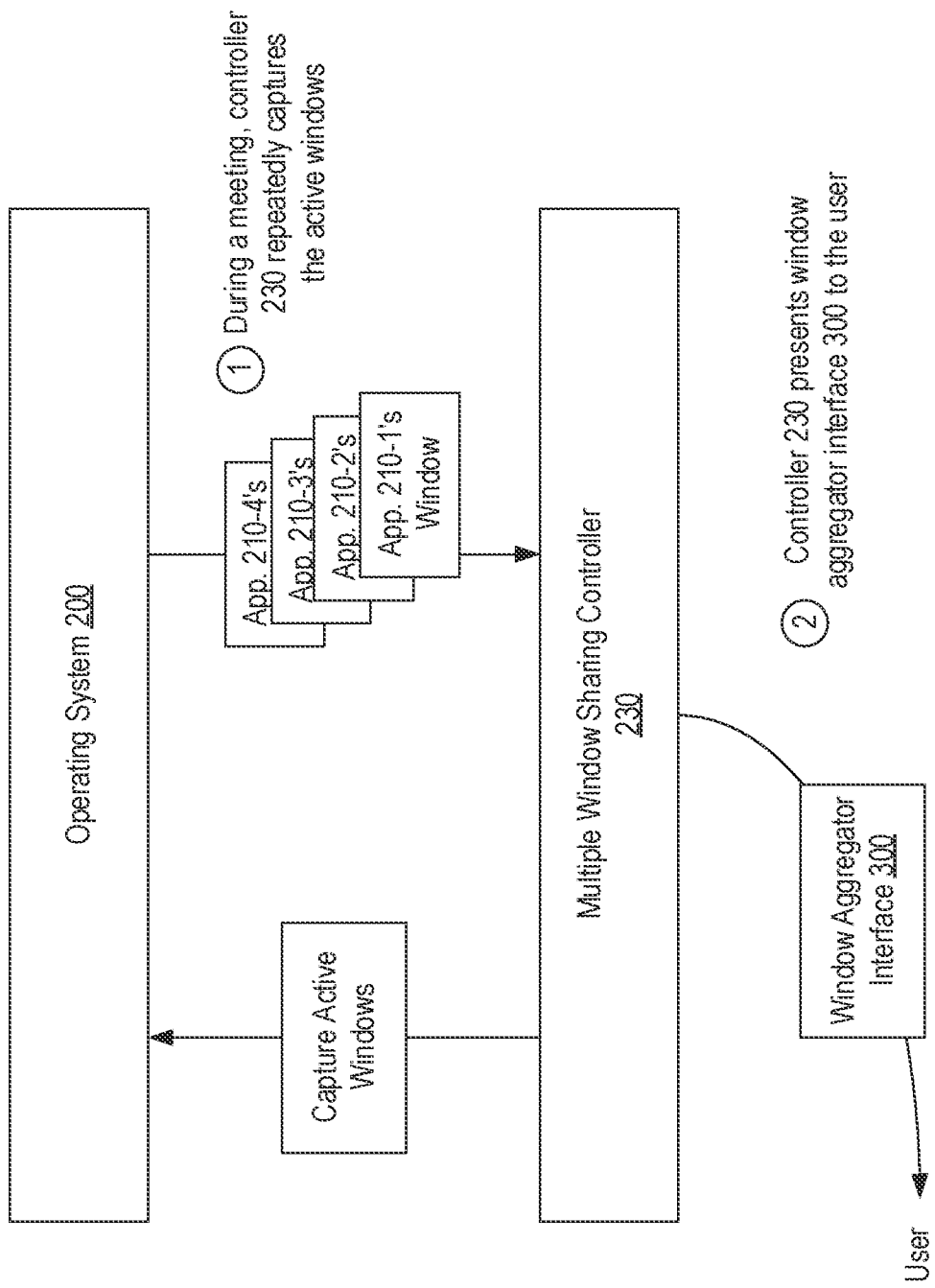
FIGS. 4A-4E provide an example of how an aggregated window can be created and shared via a collaboration solution in accordance with one or more embodiments of the present invention.

Turning to FIG. 4A, in step 1, controller 230 can capture the active windows such as, for example, during a meeting that the user is participated in via collaboration application 220. In a Windows-based example, controller 230 may capture the active windows by employing APIs in the Windows.Graphics.Capture namespace to initiate capture sessions by which controller 230 may capture frames of the active windows. By such APIs, controller 230 can receive a frame of each active window whenever the active window is updated. Accordingly, step 1 can represent an ongoing process by which controller obtains a sequence of captured frames of each active window. Notably, controller 230 may exclude collaboration application 220's window from this process.

In conjunction with this ongoing frame capture process represented by step 1, controller 230 may present window aggregator interface 300 to the user in step 2. In some embodiments, controller 230 may include the captured frames of each active window in window aggregator interface 300. In other words, the representations of applications 210-1 through 210-4's windows that are presented in window aggregator interface 300 may be in the form of the captured frames of such active windows.

Figure 4B:
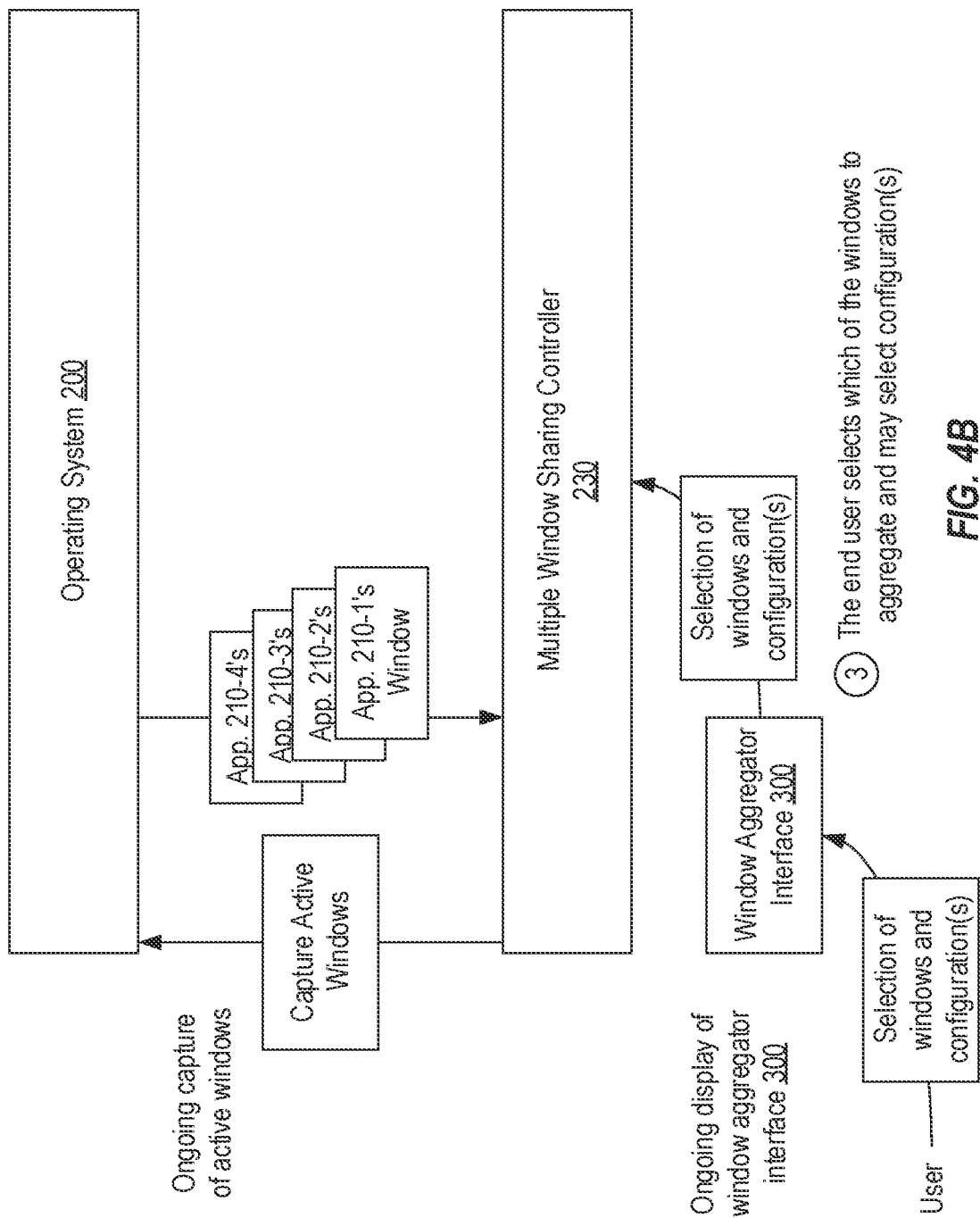

Turning to FIG. 4B, with window aggregator interface 300 displayed, in step 3, the user may select two or more of the representations of applications 210-1 through 210-4's windows that are presented therein to be included in aggregated window 301 and may also specify one or more configurations. Such configurations may include a size and/or shape of aggregated window 301, a position of any selected window within aggregated window 301, a size of any selected window within aggregated window 301 (e.g., a scaling configuration for the captured frames for a particular selected window), a shape of any selected window within aggregated window 301 (e.g., a cropping configuration for the captures frames for a particular selected window), etc. In other words, the user can specify how each selected window should appear within aggregated window 301.

Figure 4C:
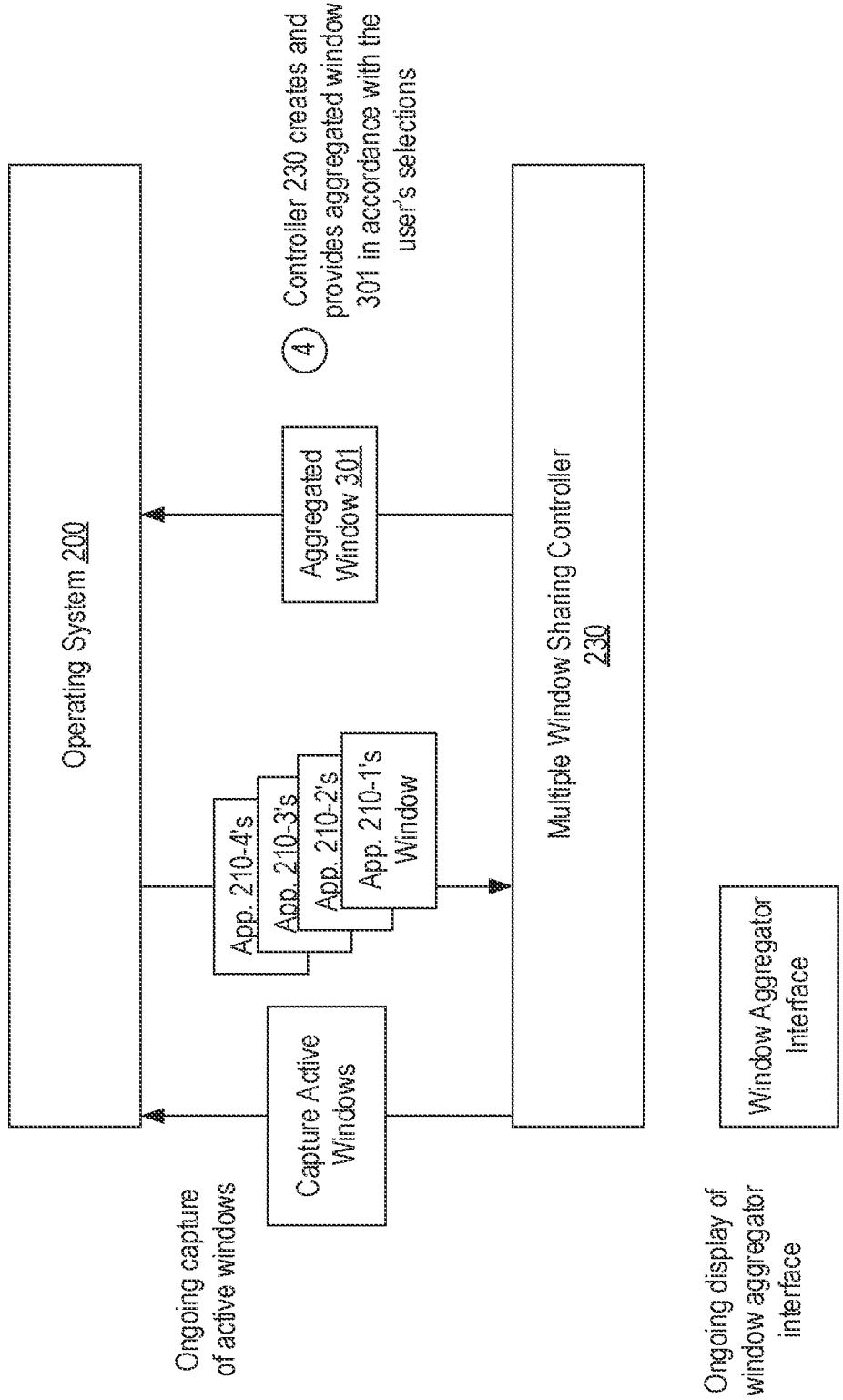

Turning to FIG. 4C, once the user has selected the active windows that are to be included in aggregated window 301 and provided any configurations, in step 4, controller 230 can commence creating and providing aggregated window 301. For example, controller 301 can employ functionality of operating system 200 (or other component(s)) cause aggregated window 301 to appear as an active window similar to the windows of applications 210-1 through 210-4. In a Windows-based example, controller 301 could call the CreateWindowEx function to create aggregated window 301, add the captured frames of the selected windows into aggregated window 301 and then call the ShowWindow function to make aggregated window 301 visible. Then, as controller 230 receives newly captured frames of the selected windows, it could update aggregated window 301 with the newly captured frames so that aggregated window 301 reflects the current state of the selected windows.

Figure 4D:
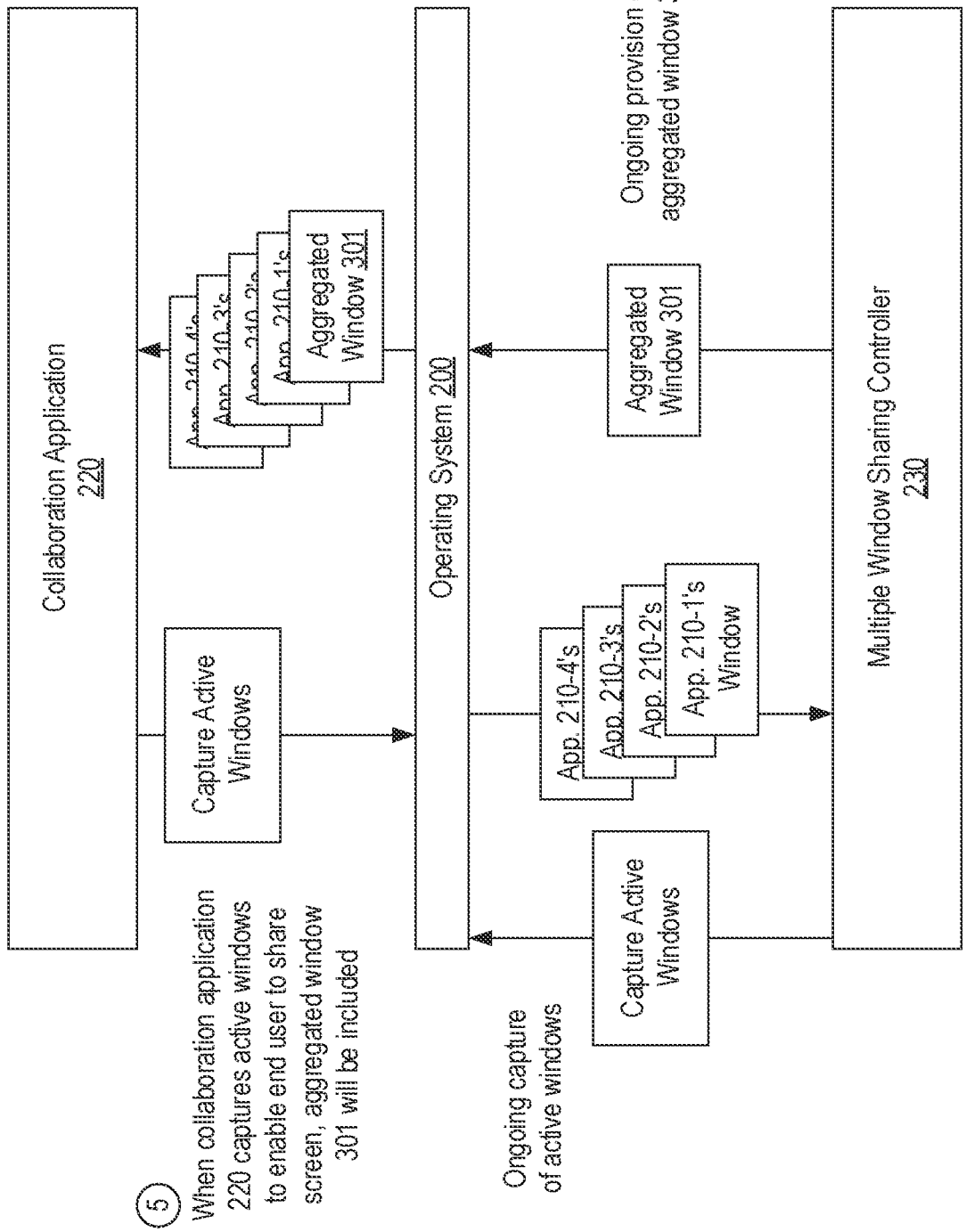

Turning to FIG. 4D, in step 5, collaboration application 220 may capture the active windows as part of enabling the user to share his or her screen during a meeting. Because aggregated window 301 is an active window, it will be captured along with the windows of applications 210-1 through 210-4 (and likely the desktop).

Figure 4E:
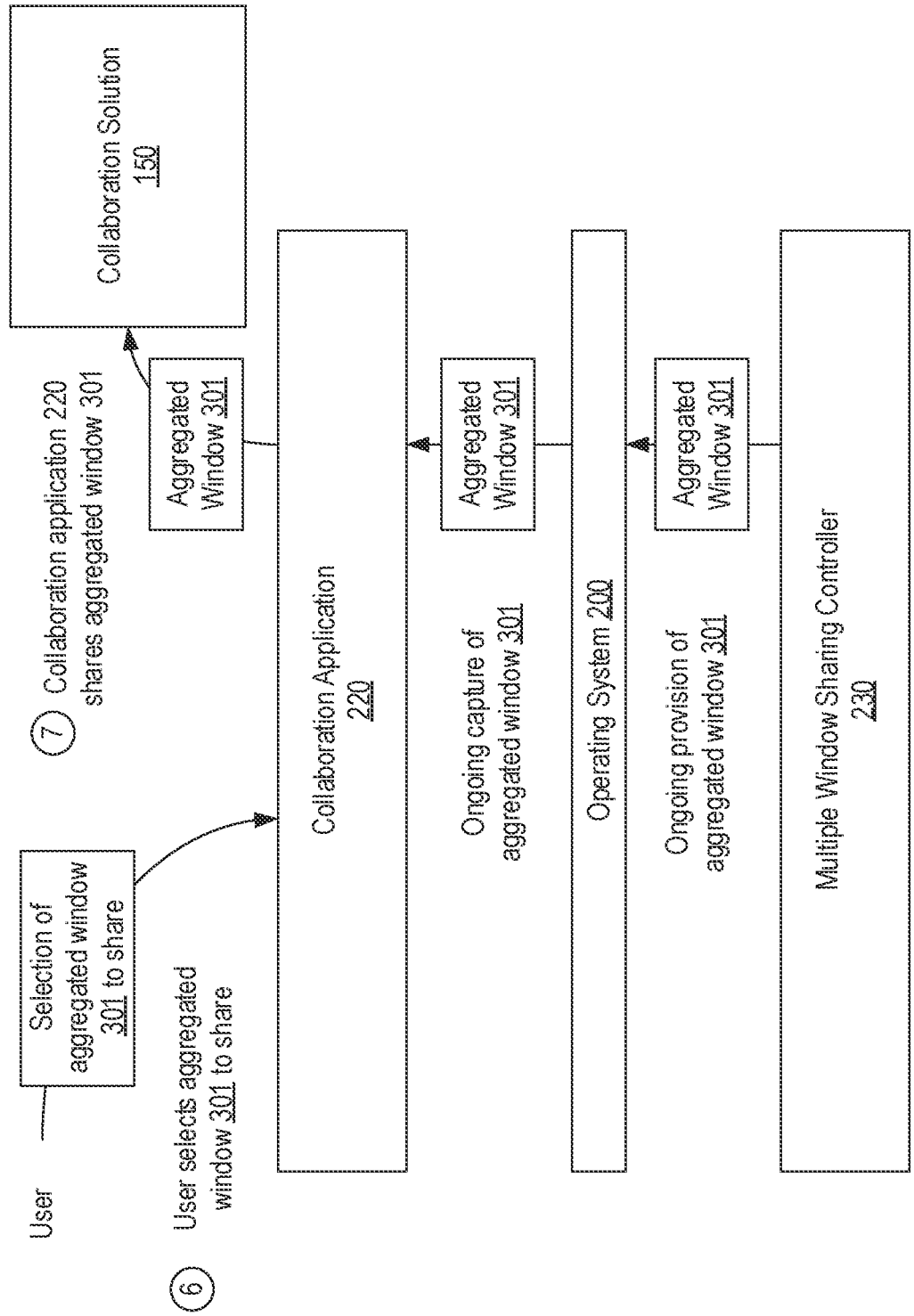

Turning to FIG. 4E, in step 6, the user can interface with collaboration application 220 to select one application's window to be shared with other meeting participants. In this example, it is assumed that the user selects aggregated window 301 to be shared. Accordingly, in step 7, collaboration application 220 can commence sharing aggregated window 301. At this point, as the selected applications' windows are updated, controller 230 will update aggregated window 301 accordingly, which in turn will be captured by collaboration application 220 and shared with the meeting participants. In this way, the user will be able to simultaneously share multiple applications' windows with the meeting participants without having to share the entire desktop.

Notably, while collaboration application 220 is sharing aggregated window 301, the user may interface with window aggregator interface 300 to change which applications' windows are selected and/or to change the configuration. In response, controller 230 can dynamically update aggregated window 301 which updates will be automatically reflected in collaboration application 220's capture of aggregated window 301. Accordingly, this simultaneous sharing of multiple applications' windows can be accomplished without any changes to collaboration application 220. In some embodiments, controller 230 can detect when the user ceases sharing his or her screen via collaboration application 220, ends/leaves a meeting, closes collaboration application 220, etc. and, in response, can stop creating aggregated window 301.

This simultaneous sharing of multiple applications' windows can be implemented for any application that has a window including native applications and web applications. Because controller 230 creates aggregated window 301 as an active window, embodiments of the present invention can be implemented on any type of operating system. Therefore, although Windows-based examples have been provided, embodiments of the present invention extend to implementations on end user devices running Linux or another operating system.

In some embodiments, controller 230 may be configured to implement the above-described functionality to enable the user to simultaneously share the content displayed on two or more monitors or other display devices. For example, when the user has a multi-monitor setup, controller 230 may capture the portion of the desktop displayed on each monitor, possibly excluding the portion of the desktop on the monitor on which collaboration application 220's user interface is displayed. For purposes of this description and the claims, a captured portion of the desktop, such as a portion that corresponds to a monitor, may be considered a "desktop window." Controller 230 can present the desktop windows in window aggregator interface 300. The user can then select two or more of the desktop windows for inclusion in aggregated window 301. In some embodiments, controller 230 may enable the user to select one or more desktop windows and one or more application windows to be aggregated into aggregated window 301.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for simultaneously sharing multiple windows via a collaboration application, the method comprising:
   presenting a window aggregator interface to a user of an end user device, the window aggregator interface including representations of multiple windows that are displayed on the end user device;
   receiving user input that selects representations of two or more of the multiple windows;
   creating an aggregated window that includes content of the two or more windows; and
   while the two or more windows remain displayed on the end user device, causing the aggregated window to be visible to a collaboration application by also displaying the aggregated window on the end user device to thereby cause the collaboration application to be make the aggregated window available for sharing.

2. The method of claim 1, wherein the multiple windows that are displayed on the end user device comprise windows of multiple applications running on the end user device.

3. The method of claim 1, wherein the multiple windows that are displayed on the end user device comprise multiple desktop windows.

4. The method of claim 1, wherein the representations of the multiple windows comprise captured frames of the multiple windows.

5. The method of claim 1, wherein the content of the two or more windows comprises captured frames of the two or more windows.

6. The method of claim 5, further comprising:
   updating the aggregated window to include newly captured frames of the multiple windows.

7. The method of claim 1, further comprising:
   receiving user input that specifies one or more configurations for the aggregated window.

8. The method of claim 7, wherein the one or more configurations comprise one or more of:
   a size of the aggregated window;
   a shape of the aggregated window;
   a size of the content of at least one of the two or more windows included in the aggregated window;
   a shape of the content of at least one of the two or more windows included in the aggregated window; or
   a position of the content of at least one of the two or more windows included in the aggregated window.

9. The method of claim 1, further comprising:
   receiving user input that selects representations of two or more different windows of the multiple windows; and
   updating the aggregated window to include content of the two or more different windows.

10. The method of claim 1, further comprising:
    updating the window aggregator interface to add a representation of a window that is displayed on the end user device.

11. The method of claim 1, further comprising:
    updating the window aggregator interface to remove one of the representations of the multiple windows.

12. The method of claim 1, wherein presenting the window aggregator interface includes:
    capturing the representations of the multiple windows that are displayed on the end user device.

13. The method of claim 12, wherein capturing the representations of the multiple windows that are displayed on the end user device comprises receiving captured frames of the multiple windows as the multiple windows are updated.

14. One or more computer storage media storing computer executable instructions which when executed on an end user device implement a method for simultaneously sharing windows of multiple applications via a collaboration application, the method comprising:
    capturing frames of multiple windows that are displayed on an end user device;
    presenting a window aggregator interface to a user of the end user device, the window aggregator interface identifying the multiple windows;
    receiving user input at the window aggregator interface that selects two or more of the multiple windows; and
    while the two or more windows remain displayed on the end user device, displaying an aggregated window that includes the captured frames of the two or more windows to thereby cause a collaboration application running on the end user device to make the aggregated window available to be shared.

15. The computer storage media of claim 14, wherein the window aggregator interface identifies the multiple windows by including the captured frames of the multiple windows.

16. The computer storage media of claim 14, wherein the method further comprises:
    receiving user input at the window aggregator interface that specifies one or more configurations for the aggregated window, the one or more configurations including:
    a size of the aggregated window;
    a shape of the aggregated window;
    a size of the captured frames of at least one of the two or more windows included in the aggregated window;
    a shape of the captured frames of at least one of the two or more windows included in the aggregated window; or
    a position of the captured frames of at least one of the two or more windows included in the aggregated window.

17. The computer storage media of claim 14, wherein the method further comprises:

updating the aggregated window to include newly captured frames of the two or more windows.

18. An end user device comprising:
one or more processors; and
computer storage media storing a multiple window sharing controller that is configured to perform the following:
  capture frames of multiple windows that are displayed on an end user device;
  present a window aggregator interface to a user, the window aggregator interface identifying the multiple windows;
  receive, via the window aggregator interface, user input that selects two or more of the multiple windows; and
  while the two or more windows remain displayed on the end user device, displayed an aggregated window that includes the captured frames of the two or more windows to thereby cause a collaboration application running on the end user device to make the aggregated window available to be shared.

19. The end user device of claim 18, wherein the multiple window sharing controller is further configured to update the aggregated window to include newly captured frames of the two or more windows.

20. The end user device of claim 18, wherein the two or more of the multiple windows comprise windows of multiple applications running on the end user device.

* * * * *